United States Patent [19]

Radeloff et al.

[11] 4,002,506

[45] Jan. 11, 1977

[54] SEMI-HARD MAGNETIC GLASS SEALABLE ALLOY SYSTEM OF COBALT-NICKEL-TITANIUM-IRON

[75] Inventors: Christian Radeloff, Bruchkobel; Horst Herrmann, Hanau, both of Germany

[73] Assignee: Vacuumschmelze GmbH, Germany

[22] Filed: Aug. 7, 1975

[21] Appl. No.: 602,779

[30] Foreign Application Priority Data

Aug. 7, 1974 Germany .......................... 2437921

[52] U.S. Cl. .............................. 148/31.55; 75/170; 148/120; 148/121

[51] Int. Cl.[2] .......................................... C04B 35/00

[58] Field of Search ............... 148/120, 121, 31.55; 75/170, 134 F

[56] References Cited

UNITED STATES PATENTS

| | | | |
|---|---|---|---|
| 2,002,689 | 5/1935 | Bozorth et al. .................... | 148/120 |
| 3,148,092 | 9/1964 | Shull .................................. | 148/120 |
| 3,350,240 | 10/1967 | Higuchi et al. ..................... | 148/121 |
| 3,410,733 | 11/1968 | Martin ................................ | 148/120 |
| 3,519,502 | 7/1970 | Masumoto et al. ................ | 148/120 |

*Primary Examiner*—Walter R. Satterfield
*Attorney, Agent, or Firm*—Hill, Gross, Simpson, Van Santen, Steadman, Chiara & Simpson

[57] ABSTRACT

A solid semi-hard magnetic alloy adapted to be sealable in glass in the system cobalt (nickel, titanium, Me) iron wherein Me is at least one metal of the group aluminum, copper, tungsten, molybdenum, vanadium, and chromium. The alloy is intermediately annealed, cold worked by at least 75%, and subjected to a final annealing. The alloy can be sealed in glass and displays magnetic and physical property characteristics making it suitable for the fabrication of storage apparatus and switching elements.

7 Claims, 2 Drawing Figures

SEMI-HARD MAGNETIC GLASS SEALABLE ALLOY SYSTEM OF COBALT-NICKEL-TITANIUM-IRON

BACKGROUND OF THE INVENTION

For the fabrication of storage apparatus and switching elements, as, for example, miniature remanent reed relays which function without an external soft-magnetic return connection, materials are required which have a coercive force $H_c$ of 16 to 80 Amperes per centimeter (A/cm), a remanence ratio $J_r/J_s$ at least 0.80 as well as a remanence flux density $B_r = J_r$ of at least 1.3 Tesla, and which are, in addition, distinguished by their good sealability in suitable glasses. These materials, furthermore, should be conveniently deformable in a hard state, and should exhibit a relatively high elasticity under magnetically favorable conditions. In addition, they should have a relatively low saturation magnetostriction λs. Note: 1 Ampere per centimeter = 1.256 Oerstedt, and 1 Tesla = 1 Volt-sec. per square metre = 10,000 Gauss.

In order to meet these magnetic, thermo-mechanical, and related technological needs, the use of magnetic semi-hard alloys has been proposed, such as a cobalt-iron-nickel-niobium-alloy, which, additionally, can contain at least one metal from the group tantalum, titanium, vanadium, zirconium, molybdenum, chromium, and tungsten (German "Auslegeschrift" 2,244,925) and a cobalt-nickel-iron-aluminum-titanium alloy (West German Pat. application No. P. 24 31 874). In the first cited alloy, the weight ratio of cobalt to iron is in the range from 3 : 2 to 1 : 2, the weight ratio of nickel to iron is in the range from 1 : 1 to 1 : 3, and the portion of niobium, or of niobium plus an additional metal, is 1 to 5 weight percent. For the use contemplated, this alloy is hardened at 600° to 900° C, and subsequently cold deformed by at least 75% with intermediate annealings at temperatures of at least 600° C.

The composition of the second cited alloy is within the domain of the multi-component system cobalt-(nickle+Aluminum+Titanium)- iron which is (delimited) by the graphically representable polygonal course A (10 % Co; 25 % (Ni+Al+Ti) ; 65 % Fe) -
B (10 % Co; 45 % (Ni+Al+Ti) ; 45 % Fe) -
C (45 % Co; 30 % (Ni+Al+Ti) ; 25 % Fe) -
D (45 % Co; 15 % (Ni+Al+Ti) ; 40 % Fe) - A, wherein the aluminum content ranges from 1 to 4% and the titanium-content ranges from 0.5 to 4% in such proportion that the sum of the aluminum and titanium contents is 2 to 5%. This alloy is intermediately annealed at 700° to 900° C, and cold worked (deformed) by at least 70% and is subjected to a final annealing at 500° to 700° C for 0.5 to 4 hours.

Disadvantageously with these alloys, especially those whose composition lies under the dotted curve T. . .S in FIG. 1 herein, the face centered cubic (fcc.), high temperature phase transforms itself with the body centered cubic (bcc.), low temperature phase which latter phase is partially diffusion conditioned and partially martensitic. The resulting anomaly which occurs during thermal expansion of these so connected alloys has the effect that glass seals therewith, especially when such seals are produced under automated conditions, either do not have the quality needed (because of the tensions which arise) or have such needed quality only as a result of great manufacturing expense.

The cobalt-nickel-iron-niobium alloy belonging to the prior art furthermore has the additional disadvantage that even in the case of a favorable sealing the primary demand for a great metal-glass bond strength is not achieved.

BRIEF SUMMARY OF THE INVENTION

The present invention relates to an alloy which apparently completely fulfills the requirements mentioned above for materials used in storage systems and switching elements both from a magnetic as well as from a mechanical and related technological view point, and which, in particular, displays substantially no perturbing hysteresis during thermal expansion, and also is suitable for efficient automated sealing with glass.

More particularly, this invention is directed to a solid, semi-hard, magnetic alloy adapted to be sealable in glass comprising a multicomponent system of cobalt-(nickel, titanium, Me) - iron. In such system, Me is at least one metal selected from the group consisting of aluminum, copper, tungsten, molybdenum, vanadium, and chromium. Also in such system, on a 100 weight percent total alloy basis, the amount of cobalt ranges from about 45 to 80 weight percent, the amount of iron ranges from about 10 to 40 weight percent, and the total amount of nickel, titanium and Me ranges from about 3 to 30 weight percent. Furthermore, on the same 100 weight percent total weight basis, the amount of nickel ranges from about 1.9 to 21 weight percent, the amount of titanium ranges from about 1 to 5 weight percent, and the amount of Me ranges from about 0.1 to 4 weight percent. The sum of titanium and Me ranges from about 2.2 to 7 weight percent.

Such an alloy is prepared by the steps of sequentially first melt fusing the starting metals at temperatures ranging from about 1500° to 1560° C. Next, one preliminarily anneals the product alloy at temperatures ranging from about 600° to 1100° C. Thereafter, one cold deforms the alloy by at least about 70% (based on cross section). Finally, one anneals the so deformed alloy at temperatures from about 500° to 700° C for a time of from about 0.5 to 4 hours.

Other and further aims, objects, purposes, advantages, uses, and the like for the present invention will be apparent to those skilled in the art from the present specification.

BRIEF DESCRIPTION OF THE DRAWINGS

For a better understanding of the invention, reference is made to the accompanying drawing in which.

DETAILED DESCRIPTION

Figure 1:
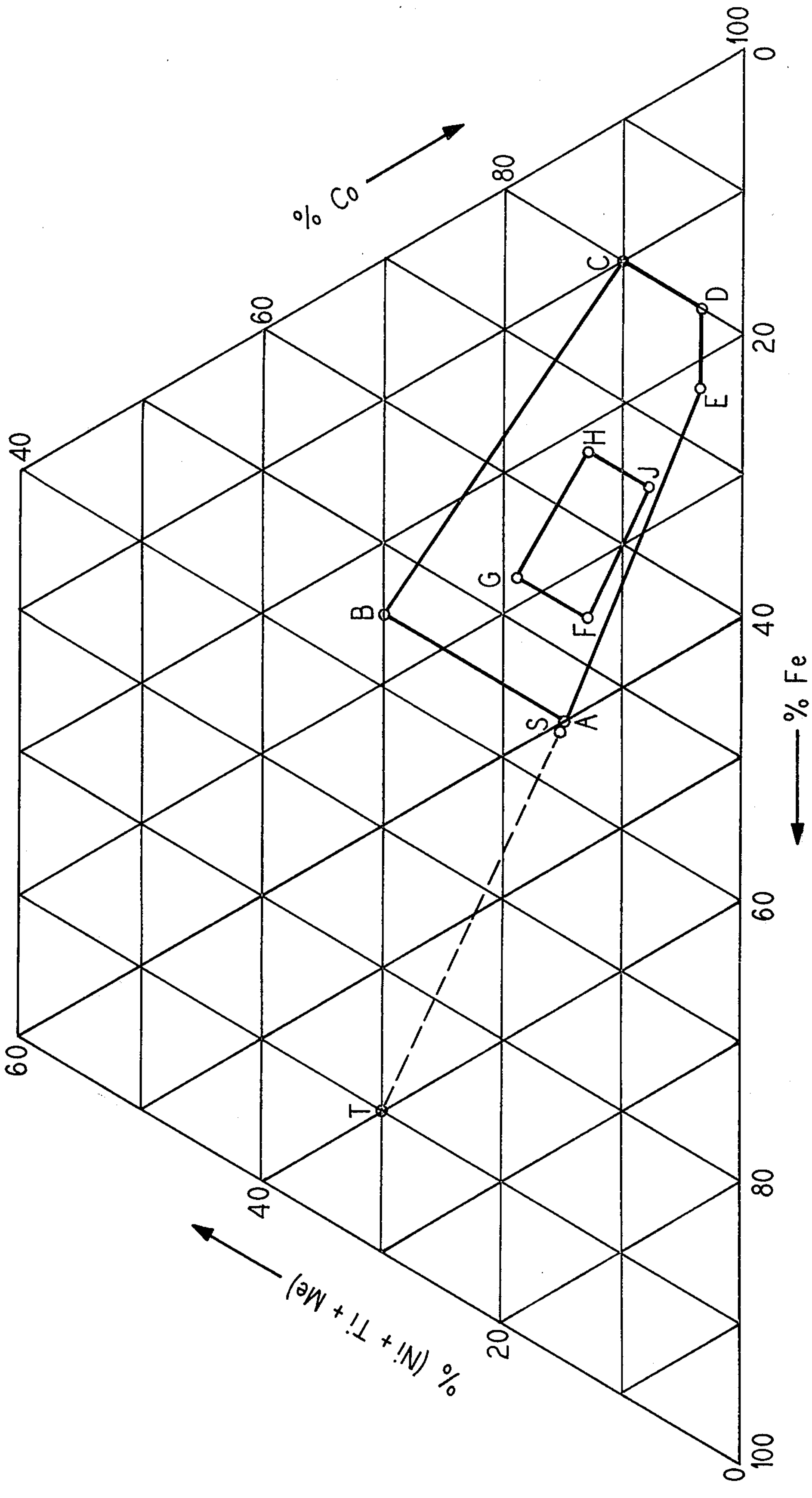
FIG. 1 is a composition diagram illustrating the relationship between cobalt, iron, and (nickel, titanium and Me, as the last symbol is defined herein) in alloy of the present invention.

Alloys of the present invention are further defined by reference to FIG. 1 wherein the polygonal region ABCDE is shown. Such region ABCDE is delimited by the polygonal course -

A (45 % Co; 15 % (Ni+Ti+Me) ; 40 % Fe) -
B (45 % Co; 30 % (Ni+Ti+Me) ; 25 % Fe) -

C (80 % Co; 10 % (Ni+Ti+Me) ; 10 % Fe) -
D (80 % Co; 3 % (Ni+Ti+Me) ; 17 % Fe) -
E (75 % Co; 3 % (Ni+Ti+Me) ; 22 % Fe) - A,

Preferred alloys of the present invention comprise those wherein on a 100 weight percent basis the amount of cobalt ranges from about 53 to 65 weight percent, the amount of iron ranges from about 22 to 34 weight percent, and the total amount of nickel, titanium, and Me ranges from about 8 to 19 weight percent. In such preferred alloys, and on the same total 100 weight percent basis, the amount of nickel ranges from about 3 to 14 weight percent, the amount of titanium ranges from about 2 to 4 weight percent, and the amount of Me ranges from about 1 to 3 weight percent. The sum of titanium and Me therein ranges from about 3 to 5 weight percent. Such preferred alloys are further defined by the polygonal region FGHJ of FIG. 1 which region is delimited by the polygonal course -

F (53 % Co; 13 % (Ni+Ti+Me); 34 % Fe) -
G (53 % Co; 19 % (Ni+Ti+Me); 28 % Fe) -
H (65 % Co; 13 % (Ni+Ti+Me) 22 % Fe) -
J (65 % Co; 8 % (Ni+Ti+Me); 27 % Fe) - F.

As indicated above, alloys of the present invention are prepared by following the indicated sequence of steps. Preferably, the preliminary annealing is conducted in a time interval ranging from about 0.5 to 4 hours. More preferably, the preliminary annealing is conducted within temperatures ranging from about 600° to 1100° C using times ranging from about 1 to 3 hours.

Following preparation of an alloy by melt fusion using conventional techniques and equipment, the molten alloy is typically cast into an ingot of desired size and shape. After cooling, the ingot is typically subjected to forgoing operations of any desired character, forging usually being carried out at temperatures estimated to range from about 1000 to 1200° C. More than one type of forging operation may be performed on a given ingot, as those skilled in the art will readily appreciate. For example, an ingot can first be hammered by any suitable means into a billet, and then the billet can be hot rolled into a desired shape. For example, a billet may be formed into a bar by hot rolling, or into a sheet.

After such forging, the product shaped alloy, in whatever form, is subjected to a preliminary annealing operation using conditions as hereinabove indicated generally. Thereafter, the product annealed shapes are preferably pickled in a conventional pickling bath, such as one of the sulfuric acid type.

Thereafter, the shaped bodies are then cold worked (deformed) to an extent such that the original body shape is altered (e.g. expanded) in at least one direction by 70% by cross-section relative to the starting configuration. Such cold working can be performed by any conventional metallurgical processing technique, including cold rolling, cold drawing through dies, and the like, as those skilled in the art will appreciate.

Thereafter, the cold worked shape is then subjected to a final annealing using temperatures and times as above indicated. In one preferred set of processing conditions, final annealing temperatures range from about 500° to 700° C for times of from about 0.5 to 4 hours.

Preferably, and particularly advantageously, the weight ratio of Me to titanium ranges from about 1:5 to 1:1.

In one preferred product form, an alloy of this invention is in the physical form of a wire whose cross section is circular and whose diameter falls in the range of from about 0.1 to 20 mm.

In general, an alloy of this invention is characterized by having a high coercive field strength of from about 16 to 60 Amperes per centimeter, a high remanence ratio of from about 0.75 to 0.95, a remanence flux density of from about 1.3 to 1.6, and a saturation flux density of from about 1.5 to 1.75 Tesla.

The alloys of this invention can be sealed in glasses, with excellent thermal expansion coefficient characteristics. Thus, alloys of this invention generally display substantially linear expansion curves over the operational ranges normally found in storage apparatus and switching elements. Glass/metal bond strengths are excellent.

Alloys of this invention also characteristically display excellent deformability characteristics.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLES 1–13

Each of 13 alloys having a cobalt-nickel-titanium-iron base (number 1 through 13) are prepared by melting a mixture of high purity starting metals at temperatures estimated to be in the range from about 1500° to 1560° C in vacuo by using an alumina crucible disposed in an electric induction furnace. The molten metal is agitated to produce a homogeneous melt of the alloy, which melt is then poured into a metallic mold having inside dimensions of about 30 mm in diameter about 120 mm in length.

The composition of each alloy is shown below in Table 1.

TABLE I

| Alloy Example Number | Alloys having a Cobalt-Nickel-Titanium-Iron Base | | | | | | |
|---|---|---|---|---|---|---|---|
| | Alloy Composition (100 weight percent basis) | | | | | | |
| | Co | Ni | Ti | Fe* | Al | Cu | W |
| 1 | 50.10 | 13.70 | 2.94 | Remainder | 1.06 | 0 | 0 |
| 2 | 55.20 | 11.75 | 3.06 | Remainder | 1.07 | 0 | 0 |
| 3 | 58.05 | 10.30 | 3.11 | Remainder | 1.05 | 0 | 0 |
| 4 | 49.95 | 13.70 | 1.08 | Remainder | 2.94 | 0 | 0 |
| 5 | 54.90 | 11.70 | 1.09 | Remainder | 2.92 | 0 | 0 |
| 6 | 58.00 | 10.20 | 1.05 | Remainder | 2.97 | 0 | 0 |
| 7 | 64.87 | 8.30 | 3.30 | Remainder | 0.73 | 0 | 0 |
| 8 | 74.99 | 2.90 | 3.20 | Remainder | 0.91 | 0 | 0 |
| 9 | 79.76 | 0.10 | 3.20 | Remainder | 0.94 | 0 | 0 |
| 10 | 50.00 | 16.15 | 1.52 | Remainder | 0.60 | 0 | 0 |
| 11 | 55.10 | 14.20 | 1.52 | Remainder | 0.58 | 0 | 0 |
| 12 | 55.05 | 11.65 | 2.85 | Remainder | 0 | 0.95 | 0 |

TABLE I-continued

| Alloy Example Number | Alloys having a Cobalt-Nickel-Titanium-Iron Base | | | | | | |
|---|---|---|---|---|---|---|---|
| | Alloy Composition (100 weight percent basis) | | | | | | |
| | Co | Ni | Ti | Fe* | Al | Cu | W |
| 13 | 55.15 | 11.50 | 2.99 | Remainder | 0 | 0 | 0.99 |

Table I Footnote *: Percentage includes the customary impurities dependent on the melting process. However, the total proportion of deoxidation and desulphurization elements present in any given alloy is less than 1% by weight. The term "remainder" designates balance up to 100 weight percent of alloy.

Each ingot thus obtained is forged at about 1150° C into a bar whose dimensions are about 12 × 12 × 600 mm. Each resulting such bar is hot rolled at about 1000° C into a rod with a cross-section of about 5.4 × 5.4 mm. These rods are each then given a preliminary annealing at temperatures in the range of about 600° to 1100° C for a time of from about 2 to 4 hours. The annealed rods are then pickled in a sulfuric acid pickling bath. Each rod is then cold deformed by means of drawing through wire forming dies which result in deforming the thickness of each rod by about 64, 84, 93.5, or 95% to form wires whose diameters are, respectively, 34, 23, 1.45, or 1.3 mm. Thereafter, the product wires are each then subjected to a final annealing at temperatures ranging from about 500° to 700° C for a time of about 2 hours.

From each wire finished in this manner, 100 mm sample lengths are prepared to evaluate the influence of the final heat treatment on magnetic, mechanical and related physical characteristics.

The thermal expansion coefficient in the temperature range from 20° to 600° C is determined for three alloys of the invention (Nos. 1, 2 and 3), and its dependence upon pretreatment conditions is determined.

Moreover phase changes were investigated by measurements of electric resistance in dependence on aging time and temperature. These measurements are supplemented by X-ray fine structures and structural tests. In addition, sealing tests are carried out in order to determine fusability (sealability) in the case of soft glasses and in order to determine the elastic residual tensions depending on the cooling speed after the fusion process.

The results are shown below in Table II.

TABLE II

Characteristic values of the alloys in Table I, having a Cobalt-Nickel-Titanium-Iron Base, dependent on cold working and final heat treatment.

| Alloy No. | Cold Working % deformation | Final Annealing Temperature (° C) | Final Annealing Time (hours) | Coercive Force (1) | Remanence (2) | Remanence Flux Density (3) | Saturation Flux Density (4) | Vickers hardness (in hard state) (5) |
|---|---|---|---|---|---|---|---|---|
| 1 | 95 | 600 | 2 | 53 | 0.89 | 1.49 | 1.68 | 490 |
| 2 | 95 | 500 | 2 | 30 | 0.90 | 1.50 | 1.67 | 495 |
| 2 | 95 | 600 | 2 | 52 | 0.89 | 1.45 | 1.63 | — |
| 2 | 95 | 750 | 2 | 12 | 0.83 | 1.30 | 1.57 | — |
| 2 | 93.5 | 550 | 2 | 36 | 0.90 | 1.50 | 1.67 | 470 |
| 2 | 84 | 550 | 2 | 36 | 0.84 | 1.38 | 1.65 | 415 |
| 4 | 64 | 550 | 2 | 36 | 0.78 | 1.30 | 1.67 | 380 |
| 3 | 95 | 550 | 2 | 37 | 0.91 | 1.51 | 1.60 | 450 |
| 3 | 95 | 600 | 2 | 50 | 0.90 | 1.43 | 1.60 | — |
| 4 | 95 | 550 | 2 | 32 | 0.92 | 1.53 | 1.67 | 500 |
| 4 | 95 | 600 | 2 | 40 | 0.89 | 1.47 | 1.65 | — |
| 5 | 95 | 550 | 2 | 24 | 0.93 | 1.53 | 1.65 | 500 |
| 6 | 95 | 600 | 2 | 18 | 0.89 | 1.50 | 1.68 | 495 |
| 7 | 95 | 600 | 2 | 42 | 0.83 | 1.31 | 1.57 | 360 |
| 8 | 95 | 650 | 2 | 22 | 0.83 | 1.34 | 1.61 | 350 |
| 9 | 95 | 650 | 2 | 18 | 0.81 | 1.31 | 1.60 | 360 |
| 10 | 95 | 550 | 2 | 24 | 0.74 | 1.27 | 1.72 | 340 |
| 11 | 95 | 500 | 2 | 21 | 0.70 | 1.22 | 1.74 | 340 |
| 12 | 95 | 600 | 2 | 38 | 0.84 | 1.49 | 1.77 | 470 |
| 12 | 95 | 500 | 2 | 20 | 0.90 | 1.58 | 1.75 | 470 |
| 13 | 95 | 500 | 2 | 18 | 0.87 | 1.51 | 1.73 | 465 |
| 13 | 95 | 650 | 2 | 48 | 0.82 | 1.38 | 1.68 | 465 |

From the magnetic characteristic values shown in Table II for the alloys of this invention (Nos. 1 through 9, 12 and 13), it is evident that too low a cold-working (deforming) (less than about 70%) causes a remanance ratio below the given desired value of at least about 0.80, and too high a final annealing temperature causes an insufficient coercive field strength (below about 12 A1cm). If, however, the process steps for adjusting the magnetic-semi-hard state are effected in accordance with the teachings of the present invention, the characteristic magnetic (quantities) are within the desired value ranges. Also, as illustrated in Table II, too low a content of titanium and aluminum (less than about 2.2%), results in too low a remanence ratio even if a high cold working (deforming) and final annealing, which are favorable themselves are carried out (alloys Nos. 10 and 11).

Furthermore, the $H_c$ values shown in Table II reveal that, on the one hand, the coercitive field strength for the cobalt range of 50 to 58 weight percent changes only little with an increasing cobalt content, in the case of equal production conditions, if the titanium content is in the center of the preferred range (Alloys 1 to 3), and on the other hand, the coercive force decreases when the titanium content approaches the lower desired value (alloys No. 4 to 6). Thus, the data obtained also may be regarded as supplying a work rule covering the entire desired property value range for the specific selection of alloys to be prepared or used in accordance with the present invention.

Table III

| Expansion coefficient of the Co-Ni-Ti-Fe-Al- alloy No. 2, depending on Pretreatment conditions | |
|---|---|
| Pretreatment Conditions | Expansion coefficient (1/° C) in the temperature range from 0 to 100° C |
| Strongly cold worked (deformed) | $109.10^{-7}$ |
| Annealing (1000° C) + quenching | $107.10^{-7}$ |
| Annealing (1000° C) + oven cooling furnace | $108.10^{-7}$ |
| Annealing (1000° C) + oven cooling furnace + annealing (22 hrs., 560° C) | $106.10^{-7}$ |

The magnetic semihard state of these alloys, as shown by supplemental electron-optical tests, apparently necessarily requires a fine-particle decomposition into alpha and gamma particles though there is no intent herein to be bound by theory. The coercive field strength $H_c$ of the alloys of this invention apparently depends, in particular, on the magnitude and shape anisotropy of these particles. Preconditions for the desired remanence (flux) density ($B_r$ $J_r$ 1.3T), and the rectangularity of the hysteresis loop ($J_r/J_s$ 0.80) are, however, the occurence of a texture after high cold working (deforming) and a suitable heat treatment in the range of average temperatures of from about (500° to 700° C).

Figure 2:
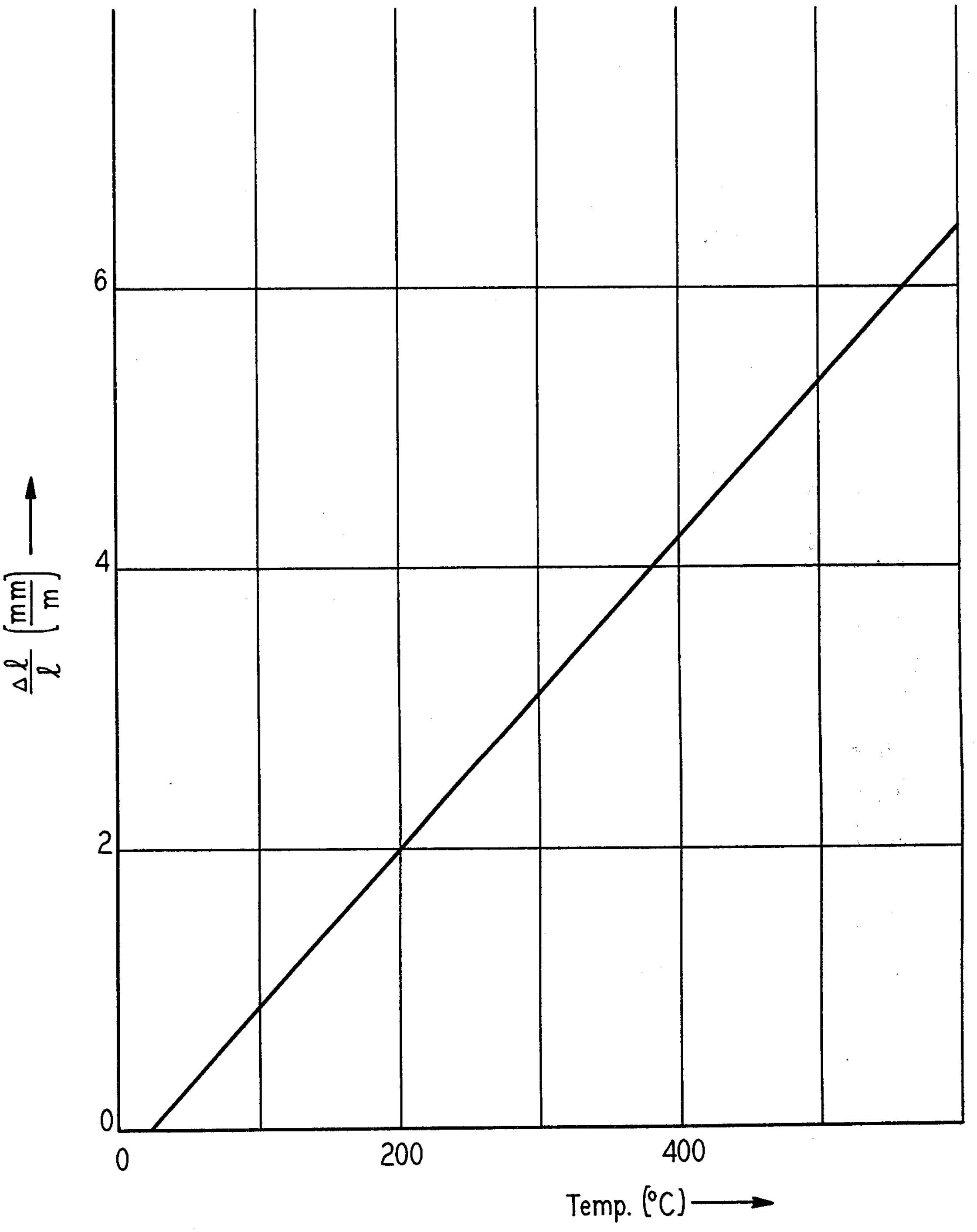
FIG. 2 is a plot showing the relationship, for one alloy of this invention as detailed in Example 2 hereinbelow, between temperature in degrees Centigrade as abscissa and corresponding expansion length change as ordinates over the temerature range of 20° through 600° C.

The fact that alloys of the present invention entirely meet the demands even regarding their expansion behavior, can be seen on the one hand, from the representative expansion curve shown in FIG. 2 (see next paragraph), and, on the other hand, from the representative expansion coefficients shown in Table III.

FIG. 2 shows the relative length change (Δl/l) of the alloy of Example No. 2 (above) in the temperature range of 20° through 600° C. This thermal expansion is characterically approximately linear with the temperature, and the curve shown is reversible during heating and cooling cycles. This linearity of the thermal expansion curve in the operational range and the reversibility in the temperature path are a substantially essential precondition for perfect metal-glass seals, as those skilled in the art will appreciate.

The expansion coefficient shown in Table III proves that the expansion behavior of the alloys of the present invention is nearly independent from their pretreatment, although the body centered cubic (bcc.) phase will predominate in the strongly cold (deformed) state, and the face centered cubic (fcc.) phase is formed almost entirely after a high temperature [annealing] followed by quenching. According to this, a perturbing hysteresis from heat expansion does not occur, even with an alloy having different phase portions.

Coinciding with the above resuls, the measured values obtained from glass sealing samples make evident that the glass tensions, expressed by the optical phase difference, both in the case of a fast and of a slow cooling lie within the permissible boundaries. It should be stressed in this connection that no martensitic conversion of a disadvantageous extent occurs in alloys of the present invention.

As noted earlier, the alloys made available in accordance with the invention also excel in view of their deformability. For instance, they may easily be stamped into contact devices. If copper is added as an additional metal, (see alloy Example No. 12), the deformability is great even in the magnetic, annealed state.

Due to their very favorable magnetic and mechanic-technological properties, in particular, their great coercive force, their high remanence ratio as well as their excellent sealability in glass and strong glass adhesion the alloys of this invention are suited for use in for memory systems and switching elements. They permit a simplified construction of such systems as well as a high operational security.

We claim:

1. A solid, semi-hard, magnetic alloy adapted to be sealable in glass, said alloy being characterized by having a coersive force of from about 16 to 60 amperes per centimeter, a remanence ratio of from about 0.75 to 0.95, a remanence flux density of from about 1.3 to 1.6 Tesla and a saturation flux density of from about 1.5 to 1.75 Tesla, said alloy being further characterized by being substantially free from a thermal expansion hysteresis, said alloy consisting essentially of a multicomponent system of cobalt- (nickel, titanium, Me) iron wherein Me is at least one metal selected from the group consisting of aluminum, copper, tungsten, molybdenum, vanadium, and chromium, and wherein on a 100 weight percent total alloy basis the amount of cobalt ranges from about 45 to 80 weight percent, the amount of iron ranges from about 10 to 40 weight percent, and the total amount of nickel, titanium and Me ranges from about 3 to 30 weight percent and wherein, on such basis, the amount of nickel ranges from about 1.9 to 21 weight percent, the amount of titanium ranges from about 1 to 5 weight percent, and the amount of Me ranges from about 0.1 to 4 weight percent, and the sum of titanium and Me ranges from about 2.2 to 7 weight percent, said alloy being defined by the polygonal region ABCDE of FIG. 1 which is delimited by the polygonal course -

A (45% Co; 15% (Ni+Ti+Me); 40% Fe) -
B (45% Co; 30% (Ni+Ti+Me); 25% Fe) -
C (80% Co; 10% (Ni+Ti+Me); 10% Fe) -
D (80% Co; 3% (Ni+Ti+Me); 17% Fe) -
E (75% Co; 3% (Ni+Ti+Me); 22% Fe) - A, said alloy having been prepared by the steps of sequentially - a. melt fusing the starting metals at temperatures ranging from about 1500° to 1560° C.,
b. preliminarily annealing said alloy at temperatures ranging from about 600° to 1100° C.,
c. cold deforming said alloy by at least about 70%, and
d. finally annealing said so deformed alloy at temperatures from about 500° to 700° C for a time of from about 0.5 to 4 hours.

2. The alloy of claim 1 wherein said preliminary annealing is conducted in a time ranging from about 1 to 3 hours.

3. The alloy of claim 1 wherein on a 100 weight percent basis the amount of cobalt ranges from about 53 to 65 weight percent, the amount of iron ranges from about 22 to 34 weight percent, and the total amount of nickel, titanium, and Me ranges from about 8 to 19 weight percent, and wherein on such basis the amount of nickel ranges from about 3 to 14 weight percent, the amount of titanium ranges from about 2 to 4 weight percent, the amount of Me ranges from about 1 to 3 weight percent, and the sum of titanium and Me ranges from about 3 to 5 weight percent, said alloy being defined by the polygonal region FGHJ of FIG. 1 which is delimited by the polygonal course -

F (53 % Co; 13 % (Ni+Ti+Me);; 34 % Fe) -
G (53 % Co; 19 % (Ni+Ti+Me); 28 % Fe) -
H (65 % Co; 13 % (Ni+Ti+Me); 22 % Fe) -
J (65 % Co; 8 % (Ni+Ti+Me); 27 % Fe) - F,

4. The alloy of claim 3 wherein said final annealing is carried out for a time ranging from about 1 to 3 hours.

5. An alloy of claim 1 in the physical form of a cross-sectionally generally circular wire having a diameter ranging from about 0.1 to 20 mm.

6. An alloy of claim 1 in the physical form of a cross-sectionally generally circular wire having a diameter ranging from about 0.2 to 5 mm.

7. An alloy of claim 1 wherein the remanence ratio is at least about 0.80.

* * * * *